UNITED STATES PATENT OFFICE.

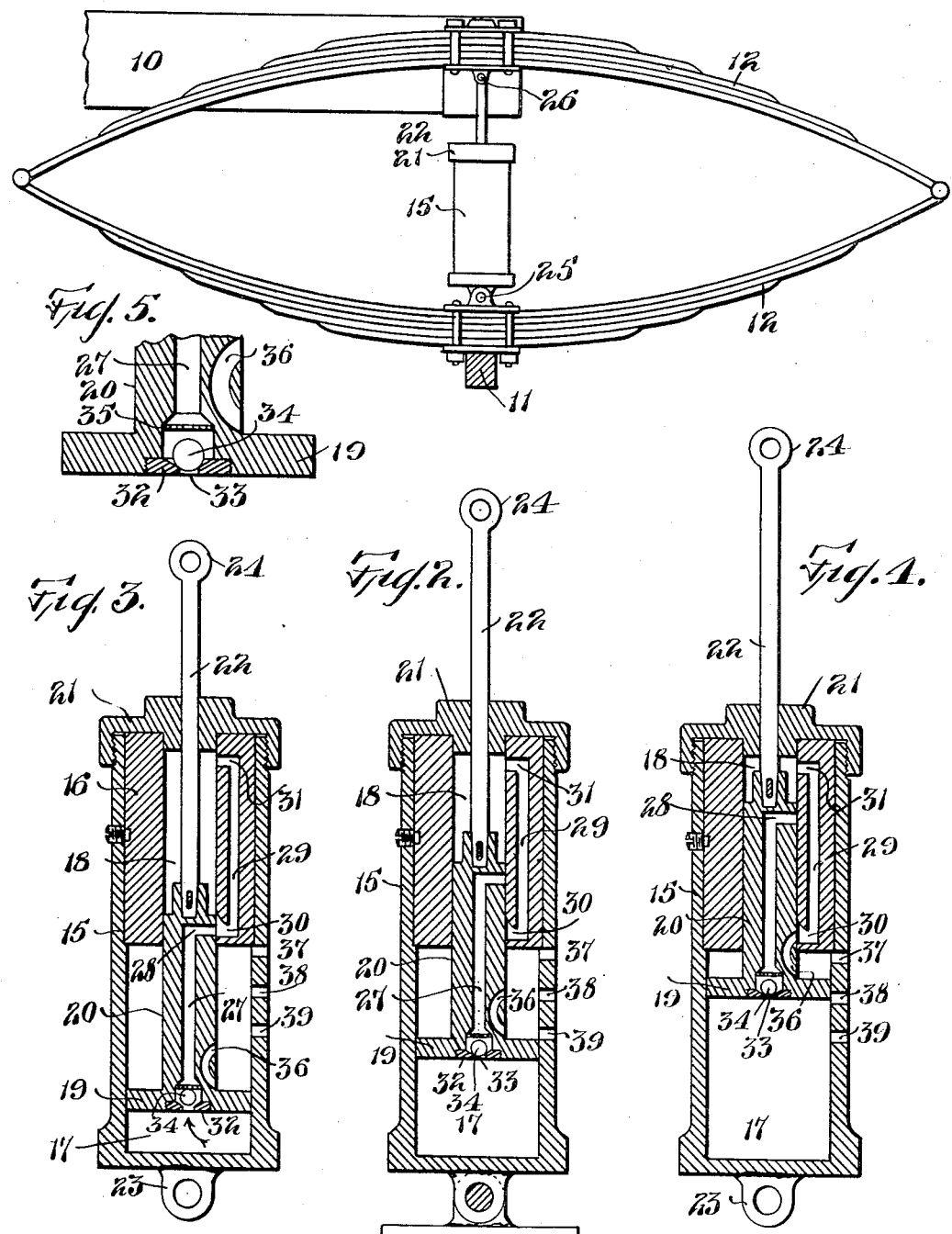

JOHN C. SHERMAN, OF BROOKLINE, MASSACHUSETTS.

SHOCK-ABSORBER AND ANTIRECOIL DEVICE.

1,117,261.

Specification of Letters Patent.

Patented Nov. 17, 1914.

Application filed August 10, 1910. Serial No. 576,582.

*To all whom it may concern:*

Be it known that I, JOHN C. SHERMAN, a citizen of the United States, residing at Brookline, in the county of Norfolk and State of Massachusetts, have invented certain new and useful Improvements in Shock-Absorber and Antirecoil Devices, of which the following is a specification.

This invention relates to shock absorbers, so called; that is, devices which are applied to bodies mounted upon springs for the purpose of protecting the spring or springs against sudden blows by resisting sudden movement of the spring mounted body with relation to the support for the springs. Devices of this character are applied to motor vehicles in such manner as to oppose sudden movement of the body with relation to the running gear, to the end that the vertical movements of the running gear may be substantially eliminated instead of being transmitted to the body or upper structure of the vehicle.

There are various types of shock absorbers now in use, one of which is the pneumatic type. It is to this specific type that the present invention relates. The mechanical devices necessary for utilizing pneumatic action are a chamber, which is usually cylindric, and a piston coöperating therewith. The chamber may be entirely closed, or may be provided with vents, or arranged to permit relatively slow leakage of the compressed air or gas. If the chamber is provided with vents, the energy expended in compressing the air becomes lost as fast as the air escapes through the vents, consequently a pneumatic shock absorber provided with vents through which the air may escape while being compressed loses the compressing energy before the piston may return to its normal position. If the device is not provided with any means of escape for the compressed air the device is nothing more than a cushion of extremely resilient character and is not adapted to eliminate relative movement but is bound to increase recoil movement.

The present invention comprises a piston and compression chamber which is closed automatically during compression, and means for transferring the compressed air or gas to the opposite side of the piston after the completion of the compressing stroke, so that the air which previously opposed movement of the piston in one direction and which contains a substantial proportion of compressing energy serves to oppose retrograde movement of the piston. The air being compressed before it is transferred to the opposite side of the piston has a relatively great initial pressure to oppose the return stroke, but this pressure is further increased by the piston during its return stroke. The device therefore possesses the advantage of having a closed chamber to oppose with relatively great efficiency the first stroke of the piston and the additional advantage of applying the energy already stored in a way which opposes reverse movement of the piston. The same air which opposes movement of the piston in one direction therefore serves to oppose movement in the opposite direction.

The device embodying the present invention is designed for a special purpose. A motor vehicle traveling over a highway in good condition does not require any device of this kind. It is desirable that the body of a motor vehicle be relatively free to play up and down upon its springs under usual conditions. It is only when the vehicle strikes a comparatively large obstacle that it is advisable to oppose free movement of the body of the vehicle. The present invention is designed to satisfy the conditions named. In fact, the present invention does more than that. Under ordinary conditions such as prevail on a highway in good condition, the device shown by the present invention serves as an additional cushion for supplementing the resilience of the vehicle springs, and it does not operate so as to eliminate relative movement of the vehicle body unless the vehicle springs are compressed to an abnormal degree. The device therefore serves two purposes: First, when the vehicle is running over a smooth road the device acts as an additional cushion, thus sharing with the springs in supporting the load; second, when the vehicle strikes an unusually large obstacle the device not only protects the springs by preventing sudden and excessive compression of the same, but it prevents subsequent excessive distention of the springs because for that purpose it utilizes the force which it received when opposing compression.

Of the accompanying drawings which illustrate one form in which the present invention may be embodied: Figure 1 represents a small portion of a motor vehicle in side elevation. Fig. 2 represents a central vertical section of the device in its normal or median position. Fig. 3 represents a similar section of the device in the position which it occupies at the end of a spring compressing stroke. Fig. 4 represents a similar section of the device showing the piston at the other limit of its movement. Fig. 5 represents on a larger scale a check valve carried by the piston.

The same reference characters indicate the same parts wherever they occur.

In Fig. 1 a portion of the frame of a vehicle body is indicated at 10. An axle is shown in cross section at 11. The upper and lower halves of an elliptic vehicle spring are indicated at 12, 12, the lower half being mounted upon the axle 11 and the other half being connected with the body frame 10 so as to support the same. It should not be presumed that the device hereinafter described is applicable only to this type of spring, because, in fact, the spring is not in any way a controlling factor, and any other type would be equally assisted by the device of the present invention. The casing of the shock absorber is indicated at 15. This casing incloses a bushing 16 which divided the interior of the casing into two chambers indicated respectively at 17 and 18. The chamber 17 is relatively large, and the chamber 18 is relatively small. The chamber 17 is occupied by a piston 19 formed at one end of a plunger 20 which is fitted to slide in the chamber 18. The plunber 20 constitutes a piston in its relation to the chamber 18. The outer end of the chamber 17 is closed by an end wall of the casing, and the outer end of the chamber 18 is closed by a head 21. The piston rod 22 is affixed to the plunger 20 and has a bearing in the head 21.

For convenience in attaching the device, the end wall of the casing 15 is provided with an ear 23, and the outer end of the piston rod is provided with an eye 24. As shown by Fig. 1 the ear and the eye are pivotally connected as indicated at 25 and 26 to the two halves 12 respectively of the vehicle spring. It is not necessary that the casing and piston rod be attached directly to the spring, but it is only necessary that they be attached respectively to any parts which are fixed respectively with relation to the frame of the running gear and the vehicle body.

The plunger 20 is provided with a central bore 27 extending from the outer face of the piston 19 to a transverse port 28 near the piston end of the plunger. The bushing 16 is provided with a by-pass 29, of which both ends open into the chamber 18, as indicated at 30 and 31. The openings 30 and 31 are arranged to register with the port 28 when the plunger 20 is near either limit of its movement. It will be further observed that the opening 30 is slightly flared, the purpose of which is hereinafter explained.

The central passage 27 in the plunger is provided with a check valve for the purpose of preventing a downward flow of air and for permitting an upward flow. A ball check valve is illustrated for this purpose, and is illustrated on a relatively large scale by Fig. 5. A disk or washer 32 having a central hole 33 constitutes the valve seat for a ball valve 34, the ball being arranged upon the upper side of the disk so as to be adapted to be normally seated by gravity. A perforated disk 35 is fixed in the passage 27 above the ball to prevent the ball from closing the passage and obstructing the upward flow of air. The last remaining feature of construction of the plunger is a secondary by-pass 36, of which one end is arranged to register with the opening 30 and of which the other end remains in the chamber 17.

The casing 15 is provided with one or more holes 37, 38 and 39 to serve as vents under certain conditions hereinafter specified. There is no necessity for packing rings for either the piston 19 or plunger 20, for a very slight leakage for both the chambers 17 and 18 is desirable. For this reason it is not necessary to finish the pistons and the walls of the chambers with extreme accuracy. A slight leakage between the piston rod 22 and its bearing in the head 21 is also preferable, although it is not necessary to provide any more leakage than would be the result of fitting the piston rod to slide easily in its bearing.

The normal or median position of the device is shown by Figs. 1 and 2. This is the position which it would occupy when the vehicle is carrying the load for which it is intended. It will be observed by reference to Fig. 2 that the piston 19 is below the hole 39 and that the lower portion of the chamber 17 is therefore a substantially closed chamber. The only leakage under these conditions would be between the piston 19 and the wall of the casing, and a slight leakage through the central passage 27 into the chamber 18 and through the bearing in the head 21. The aggregate leakage at these points is negligible, but at the same time is sufficient to permit the pressure in either of the chambers to increase or decrease to atmospheric pressure within the space of a few seconds under ordinary conditions.

To describe the operation of the device when the vehicle strikes an unusually large obstacle, such as a railroad crossing, for example, it may be assumed that the plunger is in the position shown in Fig. 2 immediately prior to striking the obstacle. The effect of striking the obstacle is to force the axle upwardly and to compress the vehicle spring. At the same time, the lower end of the casing 15 rises to meet the piston 19. In this way the air between the piston 19 and the lower end of the casing is compressed without any appreciable leakage. At the same time, the port 28 is closed by the bushing 16 until the vehicle spring has been so far compressed as to cause the port 28 and opening 30 to register one with the other. The opening 30 is located so as not to register with the port 28 for relatively slight compressions of the vehicle springs but only for maximum or nearly maximum compressions. Therefore, it may be assumed that the port 28 and opening 30 register with each other at or near the limit of a maximum relative movement of the plunger. This position is shown by Fig. 3. The flaring of the opening 30 increases the range of registration with the port 28, and as soon as the port 28 registers with any part of the opening 30 the air which is compressed in the lower part of the chamber 17 may escape through the passage 27 into the by-pass 29 and thence into the chamber 18. When the compressed air in the lower part of the chamber 17 has so far escaped into the chamber 18 as to be equal in pressure in both chambers, the ball check valve 34 automatically closes and prevents a return of the air. The energy stored in the vehicle springs now expends itself in projecting the vehicle body upwardly, thus moving the plunger in the opposite direction. The movement of the plunger 20 is now opposed by the air already under pressure which has been transferred to the small chamber 18. The return stroke of the plunger is therefore opposed to a corresponding degree, because the only escape for the air from the chamber 18 is through the bearing in the head 21 and between the plunger and the bushing 16. The leakage at these points is negligible when the plunger moves rapidly, and the upper end of the plunger is therefore opposed by a cushion of compressed air in a substantially closed chamber. When the plunger has risen so far as to cause the upper end of the by-pass 36 to register with the opening 30, as shown by Fig. 4, the air which is thus further compressed by the upward stroke of the plunger escapes to the atmosphere through the secondary by-pass 36 and vent 37.

When the piston 19 is in the position shown by Fig. 4, the lower part of the chamber 17 is opened to the atmosphere by the holes 38 and 39, so that when the piston returns to its normal position the pressure in the closed portion of the chamber 17 will be approximately the same as that of the atmosphere.

Having thus explained the nature of my said invention and described a way of constructing and using the same, although without attempting to set forth all of the forms in which it may be made or all of the modes of its use, what I claim is:

1. A shock eliminator comprising two relatively movable air-compressing elements forming two compressing chambers and having coöperative conduits the mouths of which are arranged to move to and from register with each other as said elements move relatively to compress, two of said conduits being arranged to transfer a compressed charge from one of said chambers to the other when said elements are at or near one extreme of relative movement, and two of said conduits being arranged to vent said other chamber when said elements are at or near the other extreme of relative movement, said chambers being otherwise closed.

2. A shock eliminator comprising two members, one movable back and forth within the other, the outer member having closed ends of relatively large and small internal diameter, and the inner member having ends of corresponding size fitted to compress a charge in either end of the outer member, means whereby said members may be moved with relation to each other, and conduits formed respectively in the inner and outer members and arranged to be closed when said members are between the limits of their relative movement, and to be opened when said members are at the limits of such movement, whereby a charge may be confined and compressed in the larger end of the outer member, then conducted by the said conduits to the smaller end of the outer member, and then again confined and compressed in said smaller end by reverse relative movement of said members.

3. A shock eliminator comprising two members, one movable back and forth within the other, the outer member having closed ends and the inner member fitting closely within the outer member and adapted to compress a charge in either end thereof, means whereby said members may be moved with relation to each other, and conduits formed in said members and arranged to be closed when said members are between their limits of relative movement, and to register with each other when said members are at their limits of movement, whereby a charge may be compressed in one end of the outer member by movement in one direction, then conducted to the opposite end, then compressed by reverse movement, then conducted a second time through the inner member to be discharged, said outer member having an outlet through which the charge may be discharged.

In testimony whereof I have affixed my signature, in presence of two witnesses.

JOHN C. SHERMAN.

Witnesses:
W. P. ABELL,
P. W. PEZZETTI.